United States Patent Office 3,327,026
Patented June 20, 1967

3,327,026
ESTERIFICATION OF THIONOBENZENE-PHOSPHONYLDICHLORIDE IN THE PRESENCE OF 2-METHYL-5-ETHYLPYRIDINE
Noboru Shindo, Tokyo, and Shinichi Wada, Kiyoshi Ota, Fumio Suzuki, and Yoichi Ohata, all of Onoda-shi, Yamaguchi-ken, Japan, assignors to Nissan Kagaku Kogyo Co., Ltd., Tokyo, Japan, a corporation of Japan
No Drawing. Filed July 23, 1963, Ser. No. 296,901
1 Claim. (Cl. 260—973)

This invention relates to a process of producing o-ethylparanitro-phenylthionobenzenephosphonate, a known insecticide, in high yield. In the synthesis of o-ethylparanitro-phenylthionobenzenephosphonate from thionobenzenephosphonyldichloride, the latter is reacted with ethyl alcohol $C_2H_5OH$ in a first stage reaction, thereby to obtain o-ethylthionobenzenephosphonylchloride

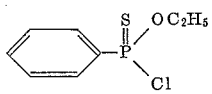

and thereby reacting the resultant product with sodium paranitro-phenolate as the second stage reaction, o-ethylparanitrophenylthionobenzenephosphonate is obtained. Said first stage reaction is an esterification reaction, so that beside the resultant o-ethylthionobenzenephosphonyl chloride there remains unreacted thionobenzenephosphonyldichloride and with further undesired eserification, a small part of the product becomes o,o-diethylthionobenzenephosphonate

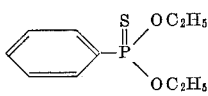

Thus, the reaction product contains in addition to o-ethylthionobenzenephosphonyl chloride, thionobenzenephosphonyl dichloride and o,o-diethylthionobenzenephosphonate. These last two substances generate impurities when the first stage reaction product is condensed with sodium paranitrophenolate in the second stage reaction, or remain and are thus the greatest cause of lowering the purity of the final product.

This esterification reaction is a reaction of removing hydrochloric acid, and therefore a catalyst for removing hydrochloric acid is added. The catalyst to be employed affects the quality of o-ethylparanitrophenylthio-nobenzenephosphonate. Accordingly, it is very important to find an excellent novel catalyst. The process of the present invention employs 2-methyl-5-ethylpyridine as a catalyst for removing hydrochloric acid, which is superior to pyridine or other organic bases conventionally used, and better from the economical point of view in case of industrialization.

The synthesis of o-ethylparanitrophenylthionobenzenephosphonate is shown by the following Equations (I) and (II), with (I') and (II') representing undesired side reactions.

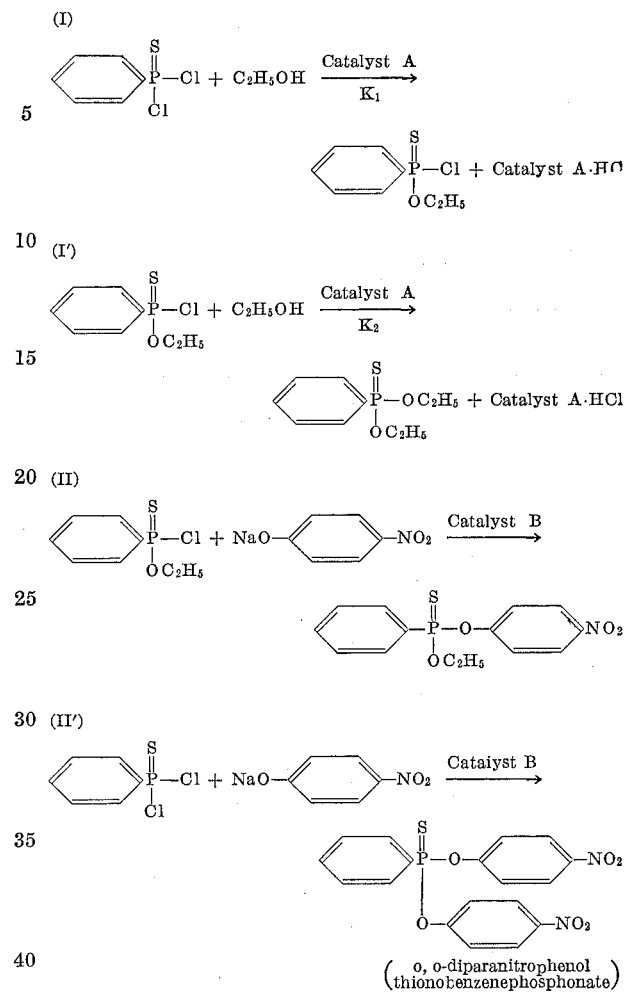

Other than the above-shown reactions various complex side-reactions are derived, but there is no serious error in considering only the principal reactions.

If the reaction velocity in the reaction (I) is represented by $K_1$ and that in the reaction (I') by $K_2$, the greater the value of $K_1/K_2$ of the catalyst, the higher the yield of

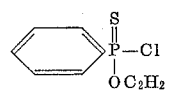

When $K_1/K_2$ is practically measured by use of pyridine, it is about 20. In the case of dimethylaniline which is generally used as the catalyst, it is about 15. On the other hand, in the case of employing 2-methyl-5-ethylpyridine it is about 100, which is quite excellent compared with the value of tertiary amine. For example, purities of o-ethylparanitrophenylthionobenzenephosphonate synthesized by use of these catalysts are shown as follows:

| Catalyst → | Dimethyl aniline, percent | Pyridine, percent | 2-methyl-5-ethylpyridine, percent |
|---|---|---|---|
| (REACTION PRODUCTS) | | | |
| ![structure]  Phenyl-P(=S)(OC₂H₅)-O-C₆H₄-NO₂  purity | 63.67 | 86.48 | 92.33 |
| Phenyl-P(=S)(O-C₆H₄-NO₂)-O-C₆H₄-NO₂ | 10.72 | 1.28 | 0.84 |
| Phenyl-P(=S)(OC₂H₅)-OC₂H₅ | 1.04 | 6.90 | 3.37 |
| Other by-products | 24.58 | 5.34 | 3.46 |
| Yield | 52.5 | 78.0 | 83.7 |

The reaction conditions of these comparative tests are shown in the following table.

| | Catalyst → | 2-methyl-5-ethyl-pyridine | Dimethyl aniline | Pyridine |
|---|---|---|---|---|
| Esterification Reaction (the first stage reaction). | Phenyl-P(=S)-Cl₂ | 63.3 g. (0.30 mol) | 63.3 g. (0.30 mol) | 63.3 g. (0.30 mol). |
| | Ethanol (98.2%) | 15.5 g. (0.3 mol x 1.10) | 16.9 g. (0.3 mol x 1.20) | 15.5 g. (0.3 mol x 1.10). |
| | Solvent | Toluene, 150 cc | Toluene, 150 cc | Toluene, 150 cc. |
| | Catalyst | 43.6 g. (0.3 mol x 1.20) | 43.6 g. (0.3 mol x 1.20) | 28.5 g. (0.3 mol x 1.20). |
| | Reaction time (ethanol dropping) | 5 hr. (2 hr.) | 6 hr. (3 hr.) | 10 hr. (5 hr.). |
| | Reaction temperature | 10° C | 45-50° C | 20° C. |
| Condensation Reaction (the second stage reaction). | p-Nitrophenolate | 59.2 g | 59.2 g | 59.2 g. |
| | Solvent | Toluene, 150 cc | Toluene, 150 cc | Toluene, 150 cc. |
| | Reaction temperature | 110° C | 110° C | 110° C. |
| | Reaction time | 3 hr | 3 hr | 3 hr. |
| Reaction Product | Phenyl-P(=S)(OC₂H₅)-O-C₆H₄-NO₂ | 92.33% | 63.67% | 86.48%. |
| | Phenyl-P(=S)(O-C₆H₄-NO₂)-O-C₆H₄-NO₂ | 0.84% | 10.72% | 1.28%. |
| | Phenyl-P(=S)(OC₂H₅)-OC₂H₅ | 3.37% | 1.04% | 6.90%. |
| | Impurities | 3.46% | 24.58% | 5.34%. |
| | Total of the by-product | 7.67% | 36.34% | 13.52%. |
| | Rough yield | 87.9 g | 80.0 g | 87.5 g. |
| | Yield | 83.7% | 52.5% | 78.0%. |

As described above, it is clear that 2-methyl-5-ethyl-pyridine stands out from others. Further, yields of other catalysts are shown in the following table.

| Reaction Product → | Phenyl-P(=S)(OC₂H₅)-O-C₆H₄-NO₂ purity | Phenyl-P(=S)(O-C₆H₄-NO₂)-O-C₆H₄-NO₂ | Yield |
|---|---|---|---|
| CATALYST | | | |
| Triethylamine, percent | 83.75 | 1.46 | 76.4 |
| α-Picoline, percent | 82.53 | 1.19 | 76.2 |
| β-Picoline, percent | 86.51 | 2.33 | 69.0 |
| 2,6-lutidine, percent | 85.63 | 3.75 | 78.1 |
| Collidine | (¹) | | |
| Quinoline, percent | 82.56 | 9.46 | 73.7 |
| Tributylamine, percent | 58.83 | 13.88 | 59.5 |

¹ Many side reactions.

The reaction conditions of these comparative tests were as follows:

(a) Materials fed:

| | | |
|---|---|---|
| thionobenzenephosphonyldichloride, (0.30 mol) | g | 63.3 |
| ethanol (purity 98,2%), (0.30 mol x 1.10) | g | 15.5 |
| toluene (solvent) | cc | 150 |

(b) Amounts of catalysts and reaction conditions:

| | Amount of catalyst (g.) | Hour for dropping of ethanol (hr.) | Reaction time (hr.) | Reaction temperature (° C.) |
|---|---|---|---|---|
| Triethylamine | 36.4 | 2 | 5 | 10 |
| α-Picoline | 33.5 | 2 | 5 | 10 |
| β-Picoline | 33.5 | 2 | 5 | 10 |
| 2,6-lutidine | 38.6 | 2 | 5 | 10 |
| Collidine | 43.6 | 2 | 5 | 10 |
| Quinoline | 46.5 | 2 | 5 | 10 |
| Tributylamine | 66.7 | 2 | 5 | 10 |

The predominant advantages where industrialization is carried out by use of the catalyst of the present invention are indicated in the following:

(1) The catalyst of the present invention is the product of a synthesis. The catalyst of the present invention can be easily synthesized from acetylene and ammonia, compared with coal system organobasic materials. Furthermore, it is an intermediate product of vinylpyridine having use in the fiber field. It is economical and easily obtained.

(2) The catalyst employed in the present invention can be easily recovered.

2-methyl-5-ethylpyridine hydrochloride formed by the reaction is neutralized with sodium hydroxide, and thereafter extracted with benzene or toluene. Almost all of the resulting 2-methyl-5-ethylpyridine is transferred into the organic solvent layer. By distilling the layer, more than 90% of purified 2-methyl-5-ethylpyridine can be obtained.

As mentioned above, according to the process of the present invention, cost is lowered by using 2-methyl-5-ethylpyridine, compared with employing other catalysts.

The present invention is explained in detail by the following example.

EXAMPLE

Materials fed:

| | | |
|---|---|---|
| Thionobenzenephosphonyldichloride (0.3 mol) | g | 63.3 |
| Alcohol (98.2%), (0.3 mol x 1.10) | g | 15.5 |
| Toluene (reaction solvent) | cc | 150 |
| 2-methyl-5-ethyl pyridine | g | 43.6 |

Reaction conditions:

| | | |
|---|---|---|
| Period for dropping of ethanol | hrs | 2 |
| Reaction time | hrs | 5 |
| Reaction temperature | ° C | 10 |

Treatment:

After removing HCl, washing is carried out with water and stirring is effected for 10 minutes. Toluene is distilled off leaving a reaction product which is relatively pure o-ethylthionobenzenephosphonyl chloride. Then, the reaction product is condensed with sodium paranitrophenolate to yield o - ethylparanitrophenylthionobenzenephosphonate.

| | | |
|---|---|---|
| The product | g | 87.9 |
| Purity | percent | 92.48 |
| Yield | do | 83.7 |

What we claim is:

A method for producing o-ethylparanitrophenylthionobenzenephosphonate comprising esterifying thionobenzenephosphonyldichloride with ethyl alcohol in the presence of 2-methyl-5-ethylpyridine as a catalyst to obtain a first state reaction product consisting primarily of o-ethylthionobenzenephosphonylchloride substantially free from diethylester byproduct, and reacting said first stage reaction with a paranitro phenolate to produce o-ethylparanitrophenylthionobenzenephosphonate.

References Cited

UNITED STATES PATENTS 2,880,226   3/1959   Peterson et al. _____ 260—973 X
3,048,517   8/1962   Chupp _____ 260—973 X CHARLES B. PARKER, *Primary Examiner.*

JOSEPH P. BRUST, *Examiner.*

BERNARD BILLIAN, FRANK M. SIKORA,
*Assistant Examiners.*

UNITED STATES PATENT OFFICE
CERTIFICATE OF CORRECTION

Patent No. 3,327,026            June 20, 1967

Noboru Shindo et al.

It is hereby certified that error appears in the above numbered patent requiring correction and that the said Letters Patent should read as corrected below.

Column 1, line 54, for "thio-nobenzenephosphonate" read -- thionobenzenephosphonate --; column 2, lines 50 to 55, for that portion of the formula reading $OC_2H_2$ read $OC_2H_5$ column 6, line 30, for "state" read -- stage --; line 33, after "reaction" insert -- product --.

Signed and sealed this 20th day of August 1968.

(SEAL)
Attest:

Edward M. Fletcher, Jr.
Attesting Officer

EDWARD J. BRENNER
Commissioner of Patents